Jan. 27, 1970 G. A. TINNERMAN 3,491,646
FASTENING MEANS FOR A ROTATIONAL FASTENER AND METHOD
Filed May 22, 1967 2 Sheets-Sheet 1

INVENTOR
GEORGE A. TINNERMAN

BY *Revere B. Gurley*

ATTORNEY

INVENTOR
GEORGE A. TINNERMAN

United States Patent Office 3,491,646
Patented Jan. 27, 1970

3,491,646
FASTENING MEANS FOR A ROTATIONAL FASTENER AND METHOD
George A. Tinnerman, 17864 Beach Road,
Lakewood, Ohio 44107
Filed May 22, 1967, Ser. No. 640,213
Int. Cl. F16b 21/02
U.S. Cl. 85—32                                      2 Claims

ABSTRACT OF THE DISCLOSURE

The rotational fastener such as a nut element has an aperture with helical ribs on the circumferential walls spaced by breaks in the periphery of the aperture. These helical ribs commence at the breaks near one surface of the element and extend axially and circumferentially, the ribs increasing in radial height with increasing distance from the one surface. The ends of the ribs serve as teeth for engagement with a shank and cut grooves in the shank.

These ribs are formed by swaging the edges of the aperture between the breaks axially and radially inwardly, using a punch element having helical surfaces to swage the ribs. Two opposed punches may be used from opposite sides of a sheet or plate element, and two sets of ribs are formed from the two sides. Preferably the ribs of two sets lie in the same helical paths.

A thickened boss may be formed for the fastening means if a sheet material is too thin. Two punch elements having circumferential shearing edges and tapered sides internally of the edges are opposed to each other and engage opposite sides of a sheet element to shear the material about the periphery of the punch element which then compresses the material radially to expand it axially. The aperture may be made in this boss and ribs formed therein as described above.

The fastener element and shank may be secured more firmly against loosening or reverse rotation by an axial impact on the shank to set the teeth of the ribs into the shank, thus increasing the resistance to reverse rotation.

Summary of invention

This invention relates to fastening means on an apertured article to engage a shank by relative rotation, and a method of forming such fastening means. The article, illustrated as a sheet or plate, has an aperture which is formed with cylindrical wall portions spaced by breaks or notches. The edges of said cylindrical wall portions adjacent one surface between the notches are swaged radially and axially to form helical ribs or partial threads on the wall portions between the notches. These ribs are formed by a punch element having helical end surfaces engaging the edges between the notches.

Two sets of partial threads or ribs may be formed by swaging on both sides of the plate or nut element, and the ribs of each set may lie in the same helical paths as the ribs of the other set. An article having a set or plurality of sets of such partial threads or ribs, when rotated on a smooth shank or stud, may cut grooves in the stud, the low end of the rib at the adjoining break forming a tooth for cutting the groove. If a second set of ribs is formed on the same article from the opposite side, the second set when in the same helical paths cuts the same grooves deeper, as the higher ends of the ribs act as the cutting teeth.

A thin sheet element may be thickened sufficiently for forming partial threads by thickening at one point. A pair of opposed punch elements having peripheral cutting edges partially shear through the material, and compact the surrounded material radially to increase its thickness.

Drawings

Description of the invention

The fastener or nut element is shown in its simplest form in FIGURES 1 to 4. A plate or sheet member 10 of mild steel has an opening 11 punched therein, this opening having one or more cylindrical arcuate surfaces 12 concentric with the axis, the ends of which are separated by notches or breaks 13 in the periphery of the opening.

Figure 3:
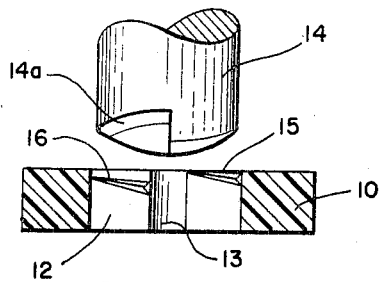
FIGURE 3 is a cross section on line 3—3 of FIGURE 2, showing the punch element used to form the fastening means.

The fastening means in this article 10 are partial threads or helical ribs formed on the inner arcuate surfaces 12 of the nut element 10 by a punch member 11 as shown in FIGURE 3. The end of this punch member 14 has an outer diameter slightly greater than the diameter of opening 11 across arcuate surfaces 12. The end has one or more identical helical surfaces 14a corresponding in circumferential extent to the arcuate surfaces 12.

A nut element 10 is placed on an anvil or base, located by a pin or boss, if desired, and the punch member 14 is then driven into opening 11, so that the helical surfaces 14a of the punch member swage or deform the corners or spaced edge portions of arcuate surfaces 12 into helical formations corresponding to partial threads 15, 16.

In the specific form shown to illustrate the principles of the invention, the punch member with identical helical surfaces forms identical threads or ribs 15, 16 on the same level or equal distances from the surface of article 10. These partial threads, therefore, lie in spaced helical paths and correspond to spaced threads.

Figure 1:
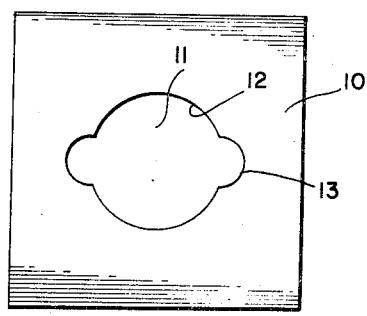
FIGURE 1 is a plan view of an apertured fastener element to be formed with the fastening means of this invention.
Figure 2:
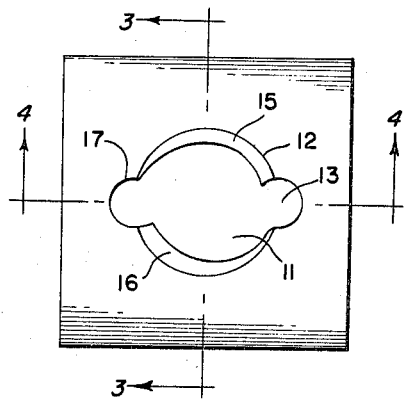
FIGURE 2 is a plan view of the element of FIGURE 1 with the fastening means formed therein.
Figure 4:
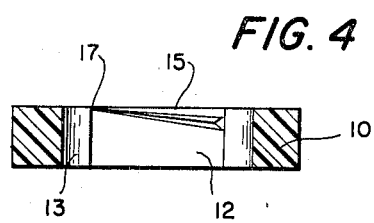
FIGURE 4 is a cross section on line 4—4 of FIGURE 2.

After the nut element is formed by the punch member 14, as shown in FIGURES 2, 3 and 4, it may be hardened if desired, as by carburizing, and the ends of the partial threads will form cutting teeth for grooving a shank on which the article such as a nut element is rotated. The leading end 17 of each partial thread or rib engages the shank to cut a groove in the shank, the partial thread following in and deepening the groove. As the partial threads lie in spaced helical paths, the end of each partial thread acts as a cutting tooth to cut its own groove, so that the shank is formed with spaced helical grooves cut by the nut element.

It is also possible to form two sets of ribs or partial threads from opposite sides of a nut element 20 by opposed punch members 24 operating simultaneously, as shown in FIGURES 5 to 8. This formation not only provides greatly increased strength by providing the double sets of cutting threads, but may increase the strength even more due to increasing the depth of the grooves.

The nut element 20 with the arcuate surfaces 22 is held between the opposed punch members 24 which are driven into the opening and engage the arcuate surfaces 22 between notches 23. Each punch member forms a set of ribs or partial threads 25, 26 and 28, 29, respectively, equally distant from the opposite surfaces of nut element 20, so that the nut element will be the same when viewed from either side.

Figure 8:
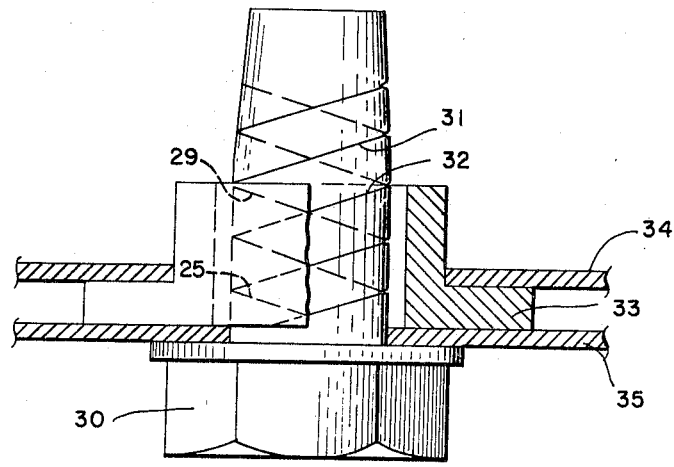
FIGURE 8 is a partial cross section of a fixed fastener element applied to a rotating shank to secure panels or brackets to each other.

In FIGURE 8, the stud 30 having a smooth shank is rotated to thread through the fastened element 20, the teeth and ribs forming two parallel, helical grooves 31 and 32 in the smooth shank. This fastener element 20 is staked to the panel 34, and the flanged head of the stud 30 clamps a second member 35 against the fastener element to secure members 34 and 35 together.

Figure 5:
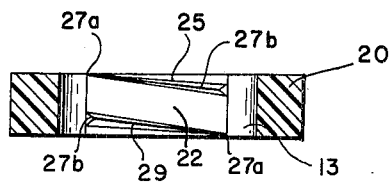
FIGURE 5 is a cross section of a modification, on line 5—5 of FIGURE 7.
Figure 6:
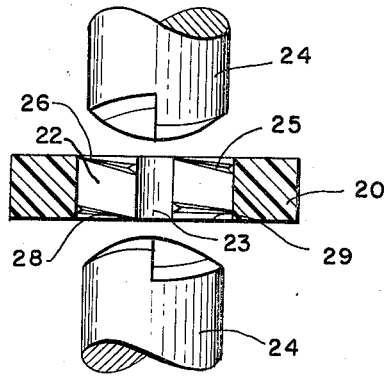
FIGURE 6 is another cross section on line 6—6 of FIGURE 7, showing the punch elements used to form the fastening elements.
Figure 7:
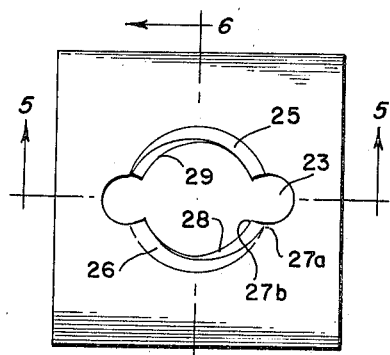
FIGURE 7 is a plan view of the modification of FIGURE 5.

It is important to note that the two sets of ribs as viewed from one side are reversed, or are mirror images, so that the low ends 27a of the ribs 25, 26 on the entering side of the shank will cut initially as the shank enters the opening from the top, as seen in FIGURES 5 and 7. When the shank then engages ribs 28, 29, the high ends 27b of the ribs engage the stud to act as cutting teeth. If the ribs of the two sets are formed in the same two spaced helical paths, it will be seen that the high ends 27b of the corresponding following ribs will continue in the grooves 31 and 32 formed in a shank 30 by the entering teeth 27a, as shown in FIGURE 8. Thus partial threads or ribs 25 and 29 may lie in the same helical path, so that the rib or thread 29 will follow in the groove 31 of the shank 30 initially cut by rib or thread 25 and the low end 27a. When the shank reaches thread 29 in its axial movement, the high end 27b of thread 29 will engage in the groove, so that this cutting tooth will deepen the same groove. The result is that two spiral grooves are cut to a greater depth by operation of the second set of partial cutting threads.

A further feature of the operation of this fastening means on an article is that the low ends 27a of the ribs initially engaging the shank cut the groove at first, but the high ends 27b of these ribs engage in the groove on reverse rotation of the nut element. The high ends of the ribs will exert great pressure on the shank and will act as teeth against rotation on the stud in the opposite direction. As a result, the nut element will not become loose on the stud and is unlikely to be unscrewed by external forces or vibration.

The reverse torque may also be increased between a shank member and nut element by sharp blows on the shank to set the teeth of the ribs into the sides of the grooves in the stud. It is possible in this manner to increase substantially the resistance of the nut element to reverse rotation off the shank, and this resistance may continue for several turns of the nut element.

Figure 9:
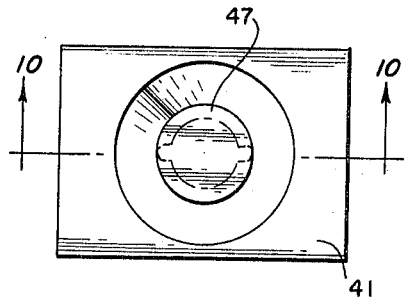
FIGURE 9 is a plan view of a formation of a sheet member to be used as a fastener element.
Figure 10:
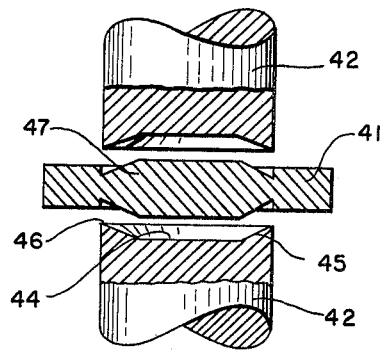
FIGURE 10 is a cross section on line 10—10 of FIGURE 9, showing the punch elements used in the formation of the fastener element.

In many cases, the sheet material may not be of sufficient thickness for this formation, and applicant in FIGURES 9 and 10 shows a method of thickening the material at a location where an opening is to be formed for the partial threads. The sheet member 41 is placed between two punch members 42, each of which has a cup-shaped end with a flat bottom surface 44 and a conical peripheral surface 45 adjacent the periphery, the peripheral edge 46 being sharp to constitute a cutting edge. As the two punch members approach each other, the cutting edges cut into the material on opposite sides and the conical surfaces compress the material radially between the punch members, thereby increasing the thickness at 47 between the punch members. The flattened bottom surfaces 44 may limit movement of the punch members and form the flattened surface on the boss portion 47 of the member 41.

This rotating fastener or nut element may be encapsulated in a rigid synthetic resinous plastic body, either in a molded body as shown in Ser. No. 549,880, filed May 13, 1966, or in an assembled structure as in Ser. No. 612,447, filed Jan. 27, 1967, now U.S. Patent 3,390,825. The smooth shank preferably has a tight fit with the plastic body, so that the nut element in compressing the plastic will increase the frictional engagement with the shank. When used with a plastic base having substantial resilience, as a cup-shaped hollow base, the teeth on the nut or fastener element may be set in the grooves of the shank by sharp impact on the shank as described above, the resilient base allowing sufficient movement for this purpose. Preferably, this action takes place while the torque force is still applied to the nut, the impact with the torque force applied simultaneously interengaging the teeth on the fastener element and groove walls on the shank at the limit of rotational movement. The nut locking effect is substantial, and when combined with the resilient pressure exerted by the base, eliminates any possibility of loosening of the fastener.

I claim:
1. A female fastener having end faces and an aperture extending through said end faces with a plurality of axial slots in the wall of said aperture and cylindrical portions between said slots and intersecting the sides of said slots, and groove cutting fastening means on said wall portions comprising a first rib swaged from a cylindrical wall portion inwardly from one end face extending between said slots and intersecting sides of the slots to form cutting teeth, said rib being inclined axially inwardly and increasing in radial height from said one end face, a second rib swaged from a cylindrical portion inwardly from the opposite end face extending between the slots and intersecting sides of the slots to form cutting teeth, the second rib being inclined axially inwardly and increasing in radial height from said opposite end face and lying on the same helical curve as the first rib, the end of said second rib nearest said one end face being of greater radial height than the corresponding end of the first rib so that the end of said second rib nearest said one end face will engage in and cut the groove formed by the cutting tooth of the first rib.

2. A female fastener having end faces and an aperture extending through said end faces with a plurality of axial slots in the wall of said aperture and cylindrical wall portions between said slots and intersecting the sides of said slots, and groove cutting fastening means on said wall portions comprising a first set of ribs swaged from said cylindrical wall portions inwardly from one end face extending between said slots and with the ends of the ribs intersecting sides of the slots to form cutting teeth, said ribs being inclined axially inwardly and lying in parallel helical curves and increasing in radial height from said one end face, a second set of ribs swaged from said cylindrical wall portions inwardly from the opposite end face extending between said slots and with the ends of the ribs intersecting sides of the slots to form cutting teeth, the ribs of said second set being inclined axially inwardly and increasing in radial height from said opposite end face and lying on the same helical curves as the ribs of said first set, the ends of said ribs of said second set nearest said one end face being of greater radial height than the corresponding ends of the ribs of said first set so that said ends of said ribs of the second set nearest said one end face will engage in and cut the grooves formed by the cutting teeth of the ribs of said first set.

References Cited

UNITED STATES PATENTS

| | | |
|---|---|---|
| 561,913 | 6/1896 | Paquette. |
| 2,723,584 | 11/1955 | Parker. |
| 2,832,972 | 5/1958 | Richards _____ 85—32 |
| 3,160,189 | 12/1964 | Hughes _____ 85—32 |
| 3,283,639 | 11/1966 | Holton. |
| 3,345,899 | 10/1967 | Fiddler _____ 85—32 |
| 3,368,444 | 12/1968 | Holton. |

EDWARD C. ALLEN, Primary Examiner

U.S. Cl. X.R.

10—86